(12) United States Patent
Rolle

(10) Patent No.: US 8,496,237 B2
(45) Date of Patent: Jul. 30, 2013

(54) APPARATUS FOR FABRICATION OF STRUCTURAL MEMBERS

(75) Inventor: David Rolle, Arundel (AU)

(73) Assignee: Rolle Industries Pty Ltd, Arundel, QLD (AU)

( * ) Notice: Subject to any disclaimer, the term of this patent is extended or adjusted under 35 U.S.C. 154(b) by 742 days.

(21) Appl. No.: 12/602,464

(22) PCT Filed: May 29, 2008

(86) PCT No.: PCT/AU2008/000764
§ 371 (c)(1),
(2), (4) Date: Nov. 30, 2009

(87) PCT Pub. No.: WO2008/144829
PCT Pub. Date: Dec. 4, 2008

(65) Prior Publication Data
US 2010/0171254 A1 Jul. 8, 2010

(30) Foreign Application Priority Data

May 31, 2007 (AU) .................................. 2007902918

(51) Int. Cl.
*B23Q 1/50* (2006.01)
(52) U.S. Cl.
USPC ............................................ 269/57; 269/287
(58) Field of Classification Search
USPC ............................................. 269/57, 287, 56
See application file for complete search history.

(56) References Cited

U.S. PATENT DOCUMENTS

| 1,507,911 | A | * | 9/1924 | Eichman | 269/99 |
| 1,566,506 | A | * | 12/1925 | Reese et al. | 414/359 |
| 1,615,860 | A | * | 2/1927 | Williams | 269/76 |
| 2,320,079 | A | * | 5/1943 | Hartwig | 269/69 |
| 3,521,875 | A | * | 7/1970 | Kapelsohn | 269/58 |
| 3,851,869 | A | * | 12/1974 | Damewood | 269/61 |
| 3,868,101 | A | * | 2/1975 | Nozaki et al. | 269/25 |
| 4,491,307 | A | * | 1/1985 | Ellefson | 269/55 |
| 4,686,925 | A | * | 8/1987 | Stuck | 114/224 |
| 5,690,323 | A | * | 11/1997 | Puttmer et al. | 269/20 |
| 5,904,347 | A | * | 5/1999 | Lin | 269/76 |
| 5,975,512 | A | * | 11/1999 | Lin | 269/76 |
| H2061 | H | * | 4/2003 | Tunnell | 410/47 |
| 6,860,800 | B1 | * | 3/2005 | Maurer | 451/364 |
| 7,448,120 | B2 | * | 11/2008 | Ohmori et al. | 29/27 C |
| 7,624,488 | B2 | * | 12/2009 | Lum et al. | 29/281.5 |
| 7,878,753 | B2 | * | 2/2011 | Kielian et al. | 414/800 |
| 2005/0212191 | A1 | * | 9/2005 | McKelvie et al. | 269/17 |

FOREIGN PATENT DOCUMENTS

| GB | 2385817 A | 9/2003 |
| JP | 10166168 A | 6/1998 |
| SU | 927473 A | 5/1982 |

(Continued)

*Primary Examiner* — Lee D Wilson
*Assistant Examiner* — Jamal Daniel
(74) *Attorney, Agent, or Firm* — Stoneman Law Patent Group; Martin L. Stoneman

(57) ABSTRACT

An apparatus for rotation of a structural beam during fabrication thereof comprises spaced mounting members, each mounting member including a base frame and a circular support bracket supported for rotation by spaced rollers mounted on said base frame. At least one of the spaced rollers includes a drive mechanism to rotate the support brackets with a beam located therein. Each support bracket comprises a beam clamp mechanism with a stationary portion and a movable portion pivotably mounted thereto to form opposable jaws to receivably locate said beam therein.

14 Claims, 5 Drawing Sheets

FOREIGN PATENT DOCUMENTS

| | | |
|---|---|---|
| SU | 933341 A | 6/1982 |
| SU | 961912 A | 9/1982 |
| SU | 967761 A | 11/1982 |
| SU | 1022861 A | 6/1983 |
| SU | 1512745 A | 10/1989 |

* cited by examiner

APPARATUS FOR FABRICATION OF STRUCTURAL MEMBERS

FIELD OF THE INVENTION

This invention is concerned with an apparatus for manipulation of structural members to assist in the fabrication thereof.

The invention is concerned particularly although not exclusively with an apparatus and method for rotation of a structural beam about a longitudinal axis during fabrication.

BACKGROUND OF THE INVENTION

In the fabrication of large steel structural members such as portal frames, roof trusses and structural beams, various elements including webs and flanges are secured by manual or automated welding processes. Typically, the web and flange elements are arranged in a predetermined juxtaposition on a surface or a purpose built support jig to facilitate joining of the various elements, usually by a fillet welding process.

Initially, the web may be supported horizontally with the flange elements positioned in an upright manner against the edges of the web. In some cases, reinforcing braces or flange support members extend across the face surface of the web between adjacent flanges thus presenting both horizontal and vertical weld tracks. Because of the size of the weld bead(s) to be deposited manually or otherwise due to limitations in automated welding apparatus, most weld beads are laid in a horizontal position.

Accordingly, in the fabrication of a structural beam with a web, main flanges, web reinforcing ribs, mounting brackets and the like, it is necessary to rotate the beam at least through four 90° quadrants during the fabrication process in order to present horizontally oriented weld bead positions. Typically, rotation of the beam during the fabrication process is effected by a gantry crane supporting the beam while balanced in a loose sling such that as the beam is elevated above the jig or support base, it is able to rotate under the influence of gravity through at least 45° whereby when lowered by the crane back onto the jig or support base, it completes a 90° quadrant rotation to present a series of horizontal weld bead positions on each side of the now upright web. This process is repeated three times to effect welding of all joints with horizontally laid weld beads.

While generally effective for its intended purpose, the use of a gantry crane is quite inefficient in terms of labour intensity and the need for fabrication jigs to be located longitudinally under the travel shadow of the gantry crane.

Moreover, the requirement to balance such beams in a support sling during rotation about a longitudinal axis is a quite dangerous procedure, particularly for tapered beams necessitating a non-central location of the supporting sling. A further disadvantage of this handling method is that a separate sling is required for differing beam sizes and configurations.

Various mechanisms for rotation of large objects about a horizontal axis are known. For example, U.S. Pat. Nos. 4,053,365, 5,437,707 and 6,860,735 all describe rotary kilns comprising an inclined cylinder supported for rotation by idler rollers engaging a circumferential track. The cylindrical kilns may be driven by a toothed pinion engaging in a toothed circumferential rack extending about the cylinder, a chain and sprocket drive, etc. While generally effective for their intended purpose, they require special thrust bearings to support the load of the inclined cylinder and otherwise are only suited to driving elongate cylindrical members.

An alternative mechanism for rotation of large objects about a longitudinal axis comprises a powered sling mechanism supportable from a gantry crane hook. The sling may be an endless loop of chain or cable and is powered by a drive motor remotely actuable by an operator. Again, this system does not really avoid the shortcomings and safety issues associated with the rotation about a longitudinal axis of large objects such as structural members whilst suspended by a gantry crane or the like.

Accordingly, it is an object of the invention to overcome or alleviate at least some of the disadvantages associated with prior art methods and apparatus for rotating large structural members about a longitudinal axis and otherwise provide steel fabricators and the like with a convenient choice.

SUMMARY OF THE INVENTION

According to one aspect of the invention there is provided an apparatus for selective rotation of an elongate member about a longitudinal axis, said apparatus comprising:— spaced mounting members, each mounting member including a base frame and a circular support bracket supported for rotation by spaced rollers mounted on said base frame, at least one of said mounting members including a drive mechanism for at least one of said spaced rollers, each said circular support bracket including an adjustable mount to support said elongate member adjacent a respective end thereof during rotation of said elongate member about a longitudinal axis thereof.

If required, one of said mounting members may be movable relative to another of said mounting members.

Suitably, one of said mounting members may be mounted on a track for movement relative to another of said mounting members.

At least one of said spaced rollers associated with each base frame may be driven for selective rotation of a circular support bracket.

Preferably, each of said spaced rollers includes a drive mechanism for selective rotation of a respective circular support bracket.

Suitably, respective drive mechanisms of each driven roller are coupled for selective rotation about a longitudinal axis of an elongate member supported between said spaced mounting members.

If required, a circumferential edge of said circular support bracket and/or a circumferential contact surface of a respective driven roller may be contoured for driving engagement therebetween.

Suitably, said circular support bracket includes an adjustable clamp mechanism to clamp an elongate member intermediate its ends.

The adjustable clamp mechanism may include opposable jaw members comprising a respective static portion of said circular support bracket and a movable portion of said support bracket pivotably coupled to said static portion.

If required, said adjustable clamp mechanism may include a locking mechanism, to lock together respective free ends of said static portion and said movable portion of said circular support bracket during rotation thereof.

Suitably locking mechanisms are positioned adjacent opposed ends of said static and movable portions to allow selective opening of said clamp mechanism from either end thereof.

Preferably the locking mechanisms are engagable with respective pivot couplings mounted on said support bracket adjacent respective said locking mechanisms.

Suitably, said opposable jaw members together define a shaped jaw opening located generally centrally of said circular support bracket.

Preferably, said shaped jaw opening has a rectangular configuration.

If required, said adjustable clamp mechanism may include lip members releasably securable to said jaw members, said lip members, in use, together defining a shaped jaw aperture corresponding to a cross-sectional region of an elongate member clamped therein.

Preferably, each said mounting member includes at least one actuating mechanism to selectively move said movable portion of said circular support bracket between a closed position and an open position about a pivotable coupling therebetween.

According to another aspect of the invention there is provided a method of rotating an elongate member about a longitudinal axis thereof, said method including the steps of:— mounting an elongate member to circular support brackets of respective spaced mounting members, each said circular support bracket being rotatably supported on spaced rollers; and, actuating a drive mechanism associated with at least one of said spaced rollers to effect rotation of said circular support brackets.

Suitably each said mounting member includes opposed actuating mechanisms to selectively move said movable portion between a closed position and an open position about a pivotable coupling at one side or an opposite side of said mounting member to permit location of said elongate member therein.

If required said elongate member may be mounted in a jaw opening defined between a stationary portion and a movable portion of said circular support bracket, said movable portion being pivotably coupled adjacent one end thereof to said stationary portion.

Preferably lip members are releasably secured to jaw members together defining said jaw opening, said lip members together defining a jaw aperture corresponding to a cross sectional region of an elongate member secured therewithin.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

BRIEF DESCRIPTION OF THE DRAWINGS

In order that the aspects of the invention may be fully understood and put into practical effect, a preferred embodiment will now be described with reference to the accompanying drawings in which:—

In the drawings, like numerals have been employed for like features for the sake of clarity.

DETAILED DESCRIPTION OF THE DRAWINGS

Figure 1:
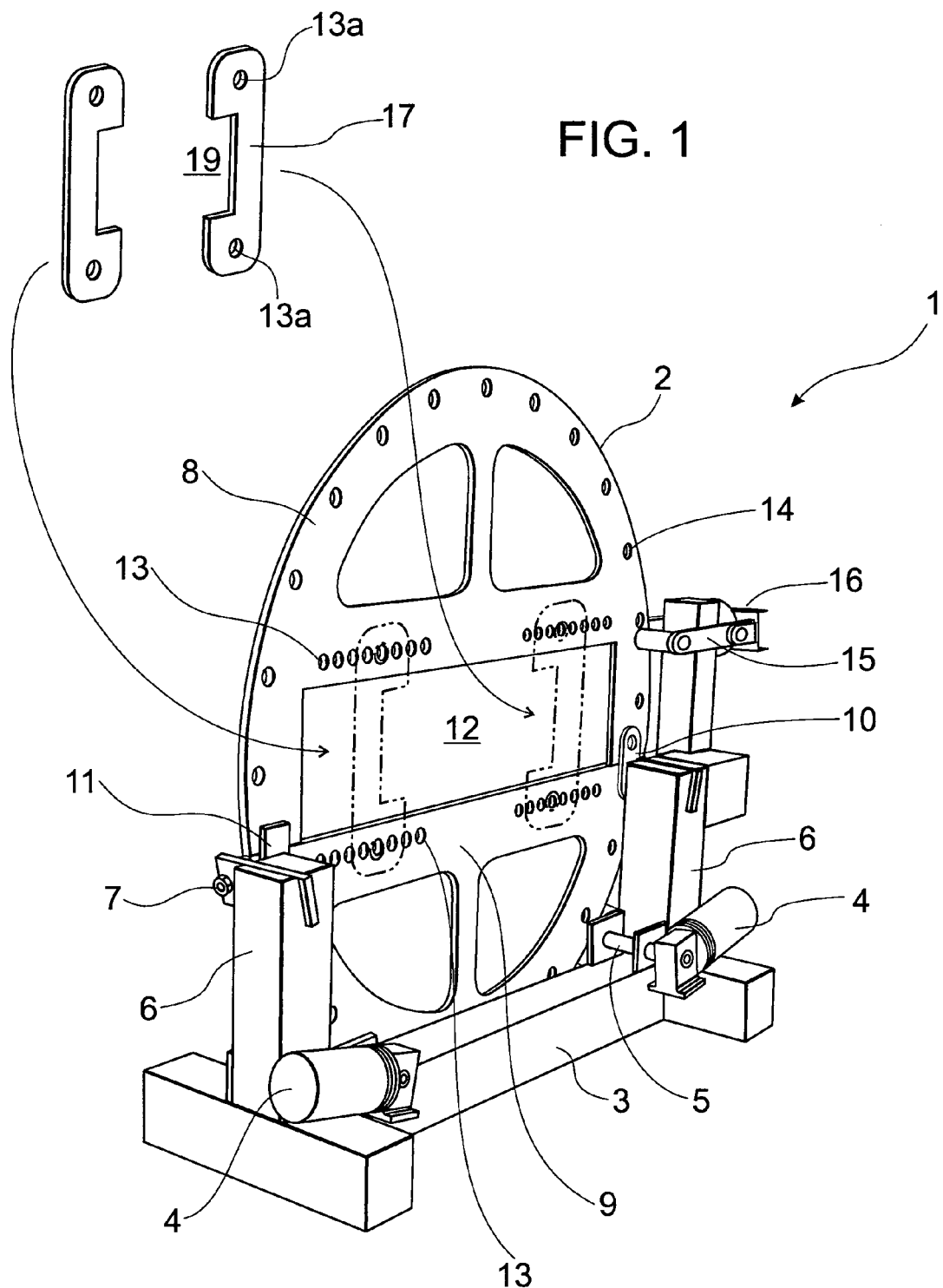
FIG. 1 shows a mounting member in a closed position.

An apparatus for selective rotation of an elongate member such as a structural beam comprises a pair of mounting members 1 spaced apart along a rotational axis of respective circular support brackets 2.

Each mounting member 1 includes a base frame 3 with support rollers (not shown) rotatably mounted thereon to rotatably support a circular support bracket 2. A drive motor 4 such as a stepping motor or the like may be coupled to a roller via a drive shaft 5. An upright post 6 on each side of base frame 3 includes a guide mechanism 7 in the form of journalled rollers (not shown) which engage opposite faces of circular support bracket 2 adjacent an outer perimeter thereof to support bracket 2 during rotation.

Circular support bracket 2 is comprised of a first jaw portion 8 pivotably mounted to a second jaw portion 9 via a pivot coupling 10. Opposite pivot coupling 10 is a lock mechanism 11 (partly shown) to lock the first and second portions 8,9 together during rotation of circular support bracket 2. Pivotably coupled portions 8,9 together define a rectangular jaw aperture 12 therebetween and a plurality of spaced apertures 13 are adapted to removably mount lip members 17 via aligned apertures 13,13a to define jaw apertures 12 of differing shapes and sizes, the purpose of which will be described later.

About the outer circumference of circular support bracket 2 are spaced apertures 14 engageable by opposable clamps 15 of a jaw opening mechanism 16.

Figure 2:
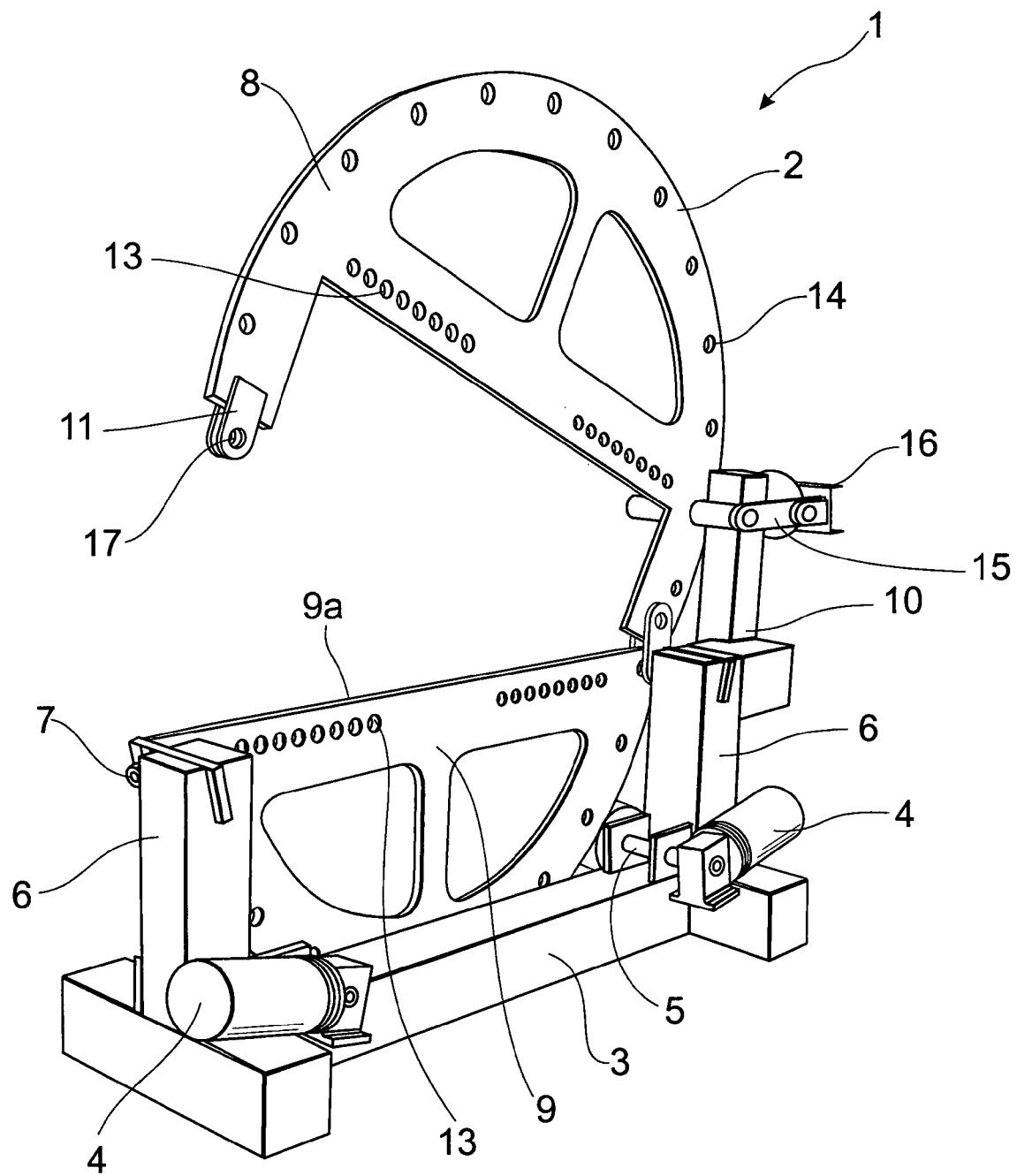
FIG. 2 shows a mounting member in an open position.

In FIG. 2, the apparatus is shown with first and second jaw portions 8,9 in an open position. To open jaw members 8,9, a locking pin (not shown) engaging aligned apertures 17 of lock mechanism 11 and second jaw member 9 is removed when the second jaw edge 9a is in a horizontal position. In this position, opposable clamps 15 are initially engaged with an adjacent aperture 14 in first jaw portion 8 and jaw opening mechanism 16 is actuated to retract clamps 15 causing first jaw member 8 to pivot to the open position as shown.

In the open position shown, an elongate beam or the like having a cross-sectional shape corresponding to jaw aperture 12 may be positioned on spaced second jaw edges 9a by a gantry crane, mobile crane, fork lift or the like. Jaw opening mechanism 16 is then actuated to close first jaw member 8 relative to second jaw member 9 and clamps 15 are disengaged. A locking pin (not shown) is then inserted into aligned apertures 17 in lock mechanism 11 and second jaw member 9 to securely locate the beam (not shown) therein.

Suitably, all four drive mechanisms 4 of the spaced mounting members are electrically coupled such that circular support brackets 2 rotate in unison when drive mechanism 4 is actuated. It readily will be apparent to a skilled addressee that a tight clamping engagement is not necessary between the jaw members 8 and 9 and a beam positioned therebetween as the beam can safely move to a limited degree in the plane of rotation of circular support member 2 as support member 2 rotates relatively slowly as to avoid high impact loads between itself and the beam.

The apparatus according to the invention is adaptable to elongate members having a wide range of cross-sectional shapes and sizes by simple interchange of lip members 17 securable to jaw members 8,9 by securing pins or bolts (not shown) via apertures 13.13a. For example, a typical portal frame beam comprises a tapered web and flange structure which may have a width at one end of up to 1200 mm and a width at its opposite end of 300 mm with a constant flange width of say 250-300 mm. Interchangeable lip members 17 allow ready adaptation of the jaw members 8,9 to elongate members wherein dimensions and/or shape change from one end to the other. For example, as shown in FIG. 1, lip members 17 can be adjusted transversely by locating the securing pins or bolts (not shown) in aligned selected mounting apertures 13,13a. For beams having a thickness less than the notched jaw 19 of lip members 17, interchangeable lip members having differing jaw apertures may be employed. Where lip members 17 are employed, a beam is first located on second jaw edges 9a and the jaw opening mechanism is actuated to close jaw member 8. With a first lip member 17 secured in place, the beam is then lifted into place in the notched jaw aperture 19 of lip member 17 while a second lip member is secured to support bracket 2. The crane than is no longer required until the finished beam is to be removed from the apparatus.

Figure 3:
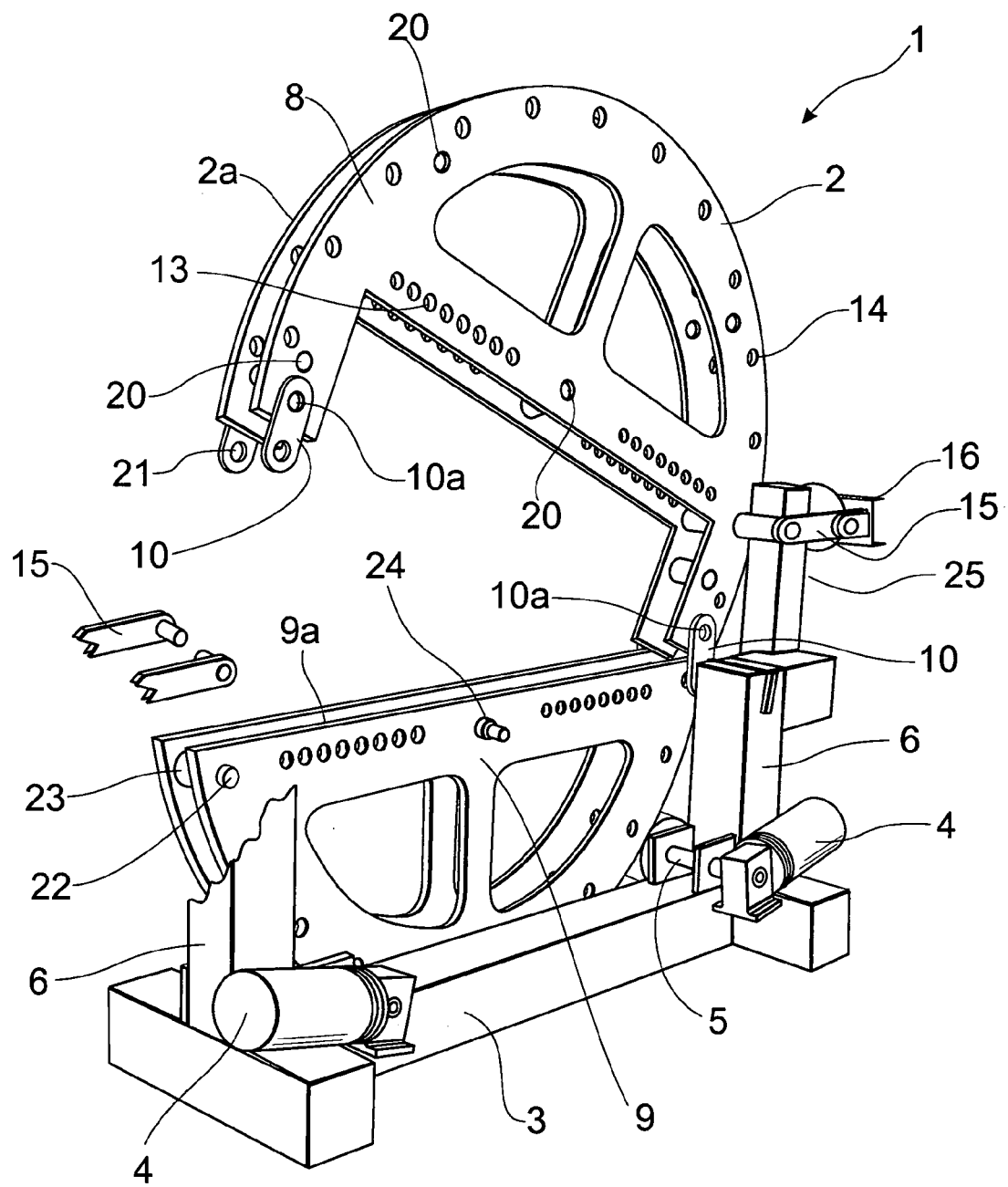
FIG. 3 shows an alternative embodiment of the mounting member of FIG. 2.

FIG. 3 shows an alternative embodiment of the apparatus of FIGS. 1 and 2.

On FIG. 3 the apparatus comprises a pair of spaced circular support brackets 2, 2a coupled by connecting pins 20 but otherwise substantially identical to the circular support bracket shown in FIGS. 1 and 2.

First jaw portion 8 of bracket 2 comprises a pair of apertured pivot couplings 10 at each inner end thereof, the pivot couplings being pivotally mounted on upper jaw portions by link pins 10a. When jaw portions 8, 9 are closed, apertures 21 in the free ends of couplings 10 are aligned with retractable locking pins 22 of locking mechanisms 23 located in opposite ends of lower jaw portion 9 to selectively lock upper and lower jaw portions 8, 9 together. Locking mechanisms 23 may comprise a pneumatic, hydraulic or electromechanical mechanism coupled to rotatable coupling 24 for connection to a source of compressed air, pressurized hydraulic fluid or a source of electric power as appropriate.

The combination of pivot couplings 10 and locking mechanisms 23 allows the jaw portions 8, 9 to be selectively opened from either side of circular support bracket 2 with a pivotable connection being maintained at an opposite side of bracket 2. In the embodiment shown jaw opening mechanisms 16 are provided on opposite sides of the apparatus for selective opening of jaw members 8, 9 from one side or the other of support bracket 2, the purpose of which selective opening function will be described later.

It will also be noted that by simultaneous retraction of both locking pins 22, the upper jaw portion 8 may be removed from the apparatus for any purpose such as maintenance or the like. If required, jaw opening mechanisms 16 may be mounted on support posts 25 in turn pivotally mounted on opposed posts 6 of base frame 3 or otherwise telescopically extendible to an extended position shown from a retracted position (not shown) below jaw edges 9a to facilitate loading of a beam into the apparatus from a conveyor system (not shown).

The structure illustrated in FIG. 3 provides a more robust structure that that illustrated in FIGS. 1 and 2 and is thus better suited to handling of larger structural beams or the like.

Figure 4:
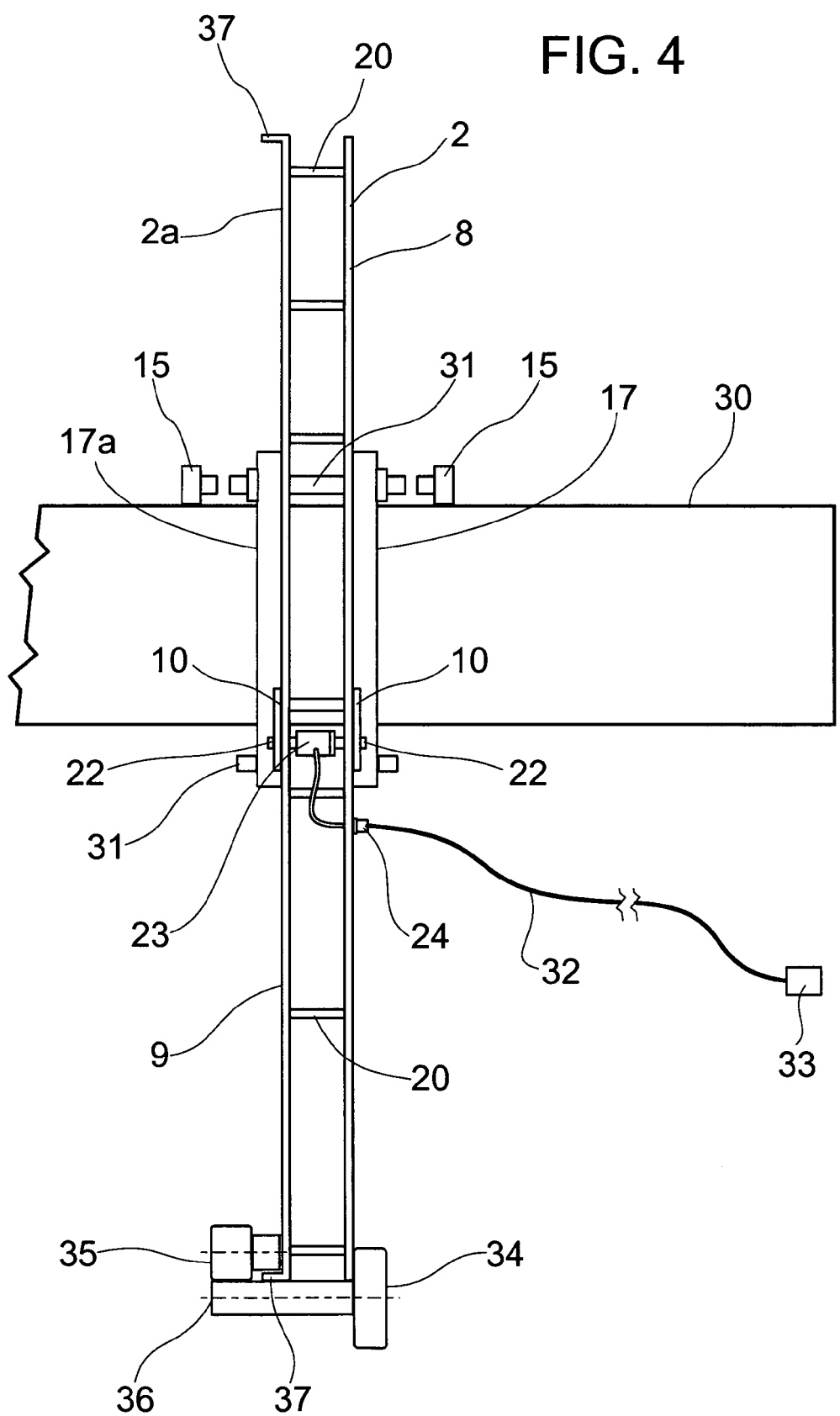
FIG. 4 shows a side elevational view of the embodiment of FIG. 3.

FIG. 4 shows a partial side elevational view of the apparatus illustrated in FIG. 3.

In FIG. 4, a structural beam 30 is shown clamped within lip members 17 secured to opposed circular support brackets 2, 2a by removable locating pins 31. Although a pair of opposed lip members 17, 17a is shown, it should be understood that a single pair of lip members 17 may be employed on either of support brackets 2, 2a.

FIG. 4 shows more clearly the locking mechanism 23 located between opposed circular support brackets 2, 2a with retractable locking pins 22 located in aligned apertures in pivot couplings 10. Rotatable coupling 24 enables rotation of circular support brackets being coupled by a conduit or cable 32 to a source 33 of compressed air, pressurized hydraulic fluid or electric power as appropriate.

The circular support bracket assembly 2, 2a may be supported for rotation on a shouldered roller assembly depicted by roll portion 34 or alternatively a roller combination depicted by roll portions 35, 36 wherein upper shouldered roller 35 engages over a peripheral rim 37 for further stability of the beam rotation apparatus.

Figure 5:
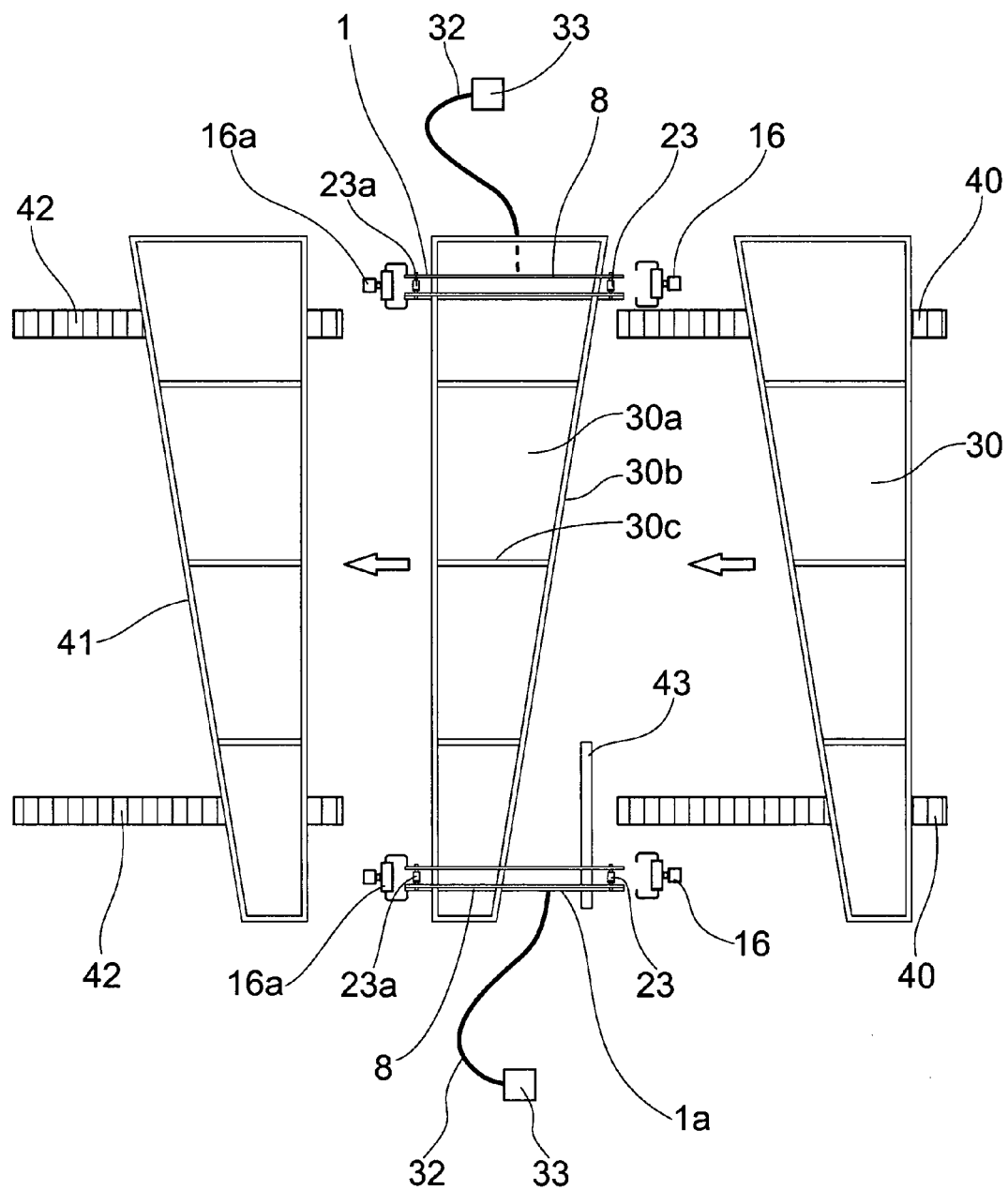
FIG. 5 is a schematic plan view of portion of a beam assembly line incorporating a pair of mounting members according to the invention.

FIG. 5 shows schematically portion of an assembly line for fabricated structural beams.

A jig mounted beam assembly or tack welded beam assembly 30 is advanced on a conveyor system 40 towards spaced mounting members 1, 1a with jaw opening mechanisms 16 in a retracted state and jaw locking mechanisms 23 disengaged while opposed jaw locking mechanisms 23a are maintained in an engaged state. Jaw opening mechanisms 16a are then actuated to open upper jaw portions 8 to receive advancing beam assembly 30. When the beam is positioned between jaw portions 8, 9, jaw opening mechanisms 16a are actuated to close jaw portions 8, 9 prior to actuating jaw locking mechanisms 23. If required, appropriately shaped lip members (not shown) can then be secured to jaw portions 8, 9 to securely locate the beam assembly within the spaced mounting members 1, 1a.

An automated or robotic welding apparatus (not shown) may then be activated to perform required welding processes between the web 30a, flanges 36b and ribs 30c of beam assembly 30 before mounting members 1, 1a are rotated in unison through 90° steps as required for a typical automated welding sequence. As shown in FIG. 5, the beam assembly 30 mounted in spaced mounting members 1, 1a has been rotated through 180° from its initial loading position. When the welding cycle is completed, the spaced mounting members 1, 1a will have rotated through 360° whereupon jaw opening mechanisms 16a are retracted, jaw locking mechanisms 23a deactivated and then jaw opening mechanisms 16 are actuated to open upper jaw portions 8. The completed beam 41 is then conveyed from the mounting members 1, 1a by a further conveyor system 42 to a finishing station or the like for a final finishing and inspection operation prior to shipping.

To accommodate beams of differing lengths, one of the mounting member base frames 3 may be fixedly secured to a support base and the other base frame may be movable relative thereto. The movable base frame may be movable between spaced mounting locations on a support base or it may be mounted on a track 43. Alternatively, both base frames 3 may be mounted on a track for relative movement therebetween.

Again it readily will be apparent to a skilled addressee that the present invention provides a simple and elegant, yet safe alternative for rotation about a longitudinal axis of elongate members such as structural beams or the like during fabrication thereof.

Many modifications or adaptations may be made to the preferred embodiments without departing from the spirit and scope of the invention.

What is claimed is:

1. An apparatus for selective rotation of an elongate member about a longitudinal axis, said apparatus comprising:
    a) spaced mounting members, each mounting member including a base frame and a circular support bracket supported for rotation by spaced rollers mounted on said base frame, at least one of said mounting members including a drive mechanism for at least one of said spaced rollers, each said circular support bracket including an adjustable mount to support said elongate member adjacent a respective end thereof during rotation of said elongate member about a longitudinal axis thereof;

b) wherein said circular support bracket includes an adjustable clamp mechanism to clamp an elongate member intermediate its ends;

c) wherein said adjustable clamp mechanism includes opposable jaw members comprising a respective static portion of said circular support bracket and a movable portion of said support bracket pivotably coupled to said static portion; and d) wherein each said mounting member includes at least one actuating mechanism to selectively move said movable portion of said circular support bracket between a closed position and an open position about a pivotable coupling therebetween.

2. An apparatus as claimed in claim 1 wherein one of said mounting members is movable relative to another of said mounting members.

3. An apparatus as claimed in claim 1 wherein one of said mounting members is mounted on a track for movement relative to another of said mounting members.

4. An apparatus as claimed in claim 1 wherein at least one of said spaced rollers associated with each base frame is driven for selective rotation of a circular support bracket.

5. An apparatus as claimed in claim 1 wherein each of said spaced rollers includes a drive mechanism for selective rotation of a respective circular support bracket.

6. An apparatus as claimed in claim 5 wherein respective drive mechanisms of each driven roller are coupled for selective rotation about a longitudinal axis of an elongate member supported between said spaced mounting members.

7. An apparatus as claimed in claim 1 wherein a circumferential edge of said circular support bracket and/or a circumferential contact surface of a respective driven roller are contoured for driving engagement therebetween.

8. An apparatus as claimed in claim 1 wherein said adjustable clamp mechanism includes a locking mechanism to lock together respective free ends of said static portion and said movable portion of said circular support bracket during rotation thereof.

9. An apparatus as claimed in claim 8 wherein locking mechanisms are positioned adjacent opposed ends of said static and movable portions to allow selective opening of said clamp mechanism from either end thereof.

10. An apparatus as claimed in claim 9 wherein said locking mechanisms are engageable with respective pivot couplings pivotably mounted on said support bracket adjacent respective said locking mechanisms.

11. An apparatus as claimed in claim 1 wherein said opposable jaw members together define a shaped jaw opening located generally centrally of said circular support bracket.

12. An apparatus as claimed in claim 11 wherein said shaped jaw opening has a rectangular configuration.

13. An apparatus as claimed in claim 11 wherein said adjustable clamp mechanism includes lip members releasably securable to said jaw members, said lip members, together defining a shaped jaw aperture corresponding to a cross-sectional region of an elongate member clamped therein.

14. An apparatus as claimed in claim 1 wherein each said mounting member includes opposed actuating mechanisms to selectively move said movable portion between a closed position and an open position about a pivotable coupling at one side or an opposite side of said mounting member to permit location of said elongate member therein.

* * * * *